United States Patent Office 3,663,608
Patented May 16, 1972

---

3,663,608
1-PHENYL-3-AMINOALKYL-1,2,3,4-TETRAHYDRO-
NAPHTHALENES AND THE SALTS THEREOF
Henry Michael Holava and Richard Anthony Partyka,
Liverpool, N.Y., assignors to Bristol-Myers Company,
New York, N.Y.
No Drawing. Filed Dec. 10, 1969, Ser. No. 883,985
Int. Cl. C07c 87/28
U.S. Cl. 260—501.1    5 Claims

ABSTRACT OF THE DISCLOSURE

The specification discloses the preparation of certain 1-phenyl-3-aminoalkyl-1,2,3,4-tetrahydronaphthalenes which have been found to have activity as either anorectic agents or central nervous system stimulants and the corresponding 3-carbamoyl-1,2,3,4-tetrahydronaphthalenes which are used as intermediates in the disclosed synthesis.

BACKGROUND OF THE INVENTION

This invention is directed to chemical compounds which are amino derivatives of 1-phenyl-1,2,3,4-tetrahydronaphthalene and to the synthesis of such compounds from the corresponding carbamoyl analogues. The amino compounds have been found to possess interesting and useful therapeutic properties in that they are characterized either as anorectic agents or central nervous system stimulates. These properties make the compounds valuable as medicaments for the treatment of mammals. Various other derivatives of tetrahydronaphthalene are known, including the n-alkylated derivatives shown in British Patent 758,144 and United States Patent 3,419,560.

It is an object of this invention to provide novel chemical compounds which can be used in the preparation of other useful chemicals.

Another object of the invention is to provide methods for the synthesis and preparation of new compounds.

Still another object of the invention is to provide compounds which have utility in treatment and the investigation of disease and other disorders found to afflict mammals and other animals.

A further object of the invention is the provision of new compounds having physiological activity making them useful in pharmacology and in the evaluation of new and diverse drugs and medicaments.

These and other related objects are achieved through this invention which provides derivatives of 1,2,3,4-tetrahydronaphthalene having the general formula

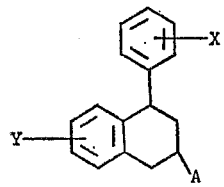

wherein X nd Y are individually selected from the group consisting of hydrogen, halogen, nitro, amino, acetamido, hydroxyl, alkoxy, preferably lower alkoxy mercapto, alkylthio, preferably lower alkylthio, trihaloalkyl, preferably trifluoro-lower-alkyl, trihaloalkoxy, preferably trifluoro-lower-alkoxy, lower alkanoyl, aminnosulfonyl, and the like, and wherein A is a member of the group consisting of $(CH_2)_a NR_1R_2$ and $(CH_2)_b CONR_1R_2$ in which $a$ can be 1, 2, or 3; $b$ can be 0, 1, 2, or 3; and $R_1$ and $R_2$ are individually selected from the group consisting of hydrogen, lower alkyl, lower alkenyl, lower alkynyl, amino-lower-alkyl, or when taken together, a cycloalkyl or nitrogen-containing heterocycle, provided that when X and Y are both hydrogen and A is $CONR_1R_2$ both $R_1$ and $R_2$ cannot be hydrogen.

A particularly preferred group of compounds are the amines of Formula II, below

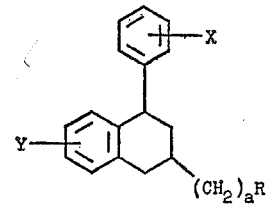

wherein X and Y are as described above; R, which corresponds to the $NR_1R_2$ moiety of Formula I, is selected from the group consisting of amino, alkylamino, dialkylamino, arylamino, polymethyleneimino, N-substituted piperazino, morpholino, thiomorpholino, dialkylaminoalkylamino, omega-hydroxylalkylamino, alkynylamino, e.g., propargyl, alkenylamino, preferably containing from 2 to 5 carbon atoms, cycloaliphaticamino, and the like; and $a$ can be 1, 2, or 3, and the pharmaceutically acceptable, nontoxic salts of such compounds. Preferred alkyl groups are the lower alkyls.

The term "lower" as used herein with respect to aliphatic groups refers to aliphatic groups containing from 1 to about 5 carbon atoms in a straight or branched chain.

The pharmaceutically acceptable, nontoxic salts mentioned above include the acid addition salts which can be prepared by reacting the free base with an organic or inorganic acid such as sulfuric, nitric, hydrochloric, hydrobromic, hydroiodic, sulfamic, sulfonic acids such as benzenesulfonic and toluenesulfonic, phosphoric, tartaric, citric, succinic, acetic, maleic, and the like. Many other organic and inorganic acids are well known to those in the art as equivalent to the above-named acids for the purpose of preparing acid addition salts.

A preferred group of compounds within the scope of Formula II, above, are those wherein $a$ is 1 and R is amino, lower alkylamino, such as methylamino, ethylamino, propylamino, isopropylamino, and the like; lower dialkylamino such as dimethylamino, diethylamino, dipropylamino, and the like; lower dialkylaminoalkyl-aminoalkylamino, e.g., dimethylaminopropylamino, diethylaminoethylamino, and the like; lower alkenylamino, e.g., propenylamino, butenylamino, pentenylamino, and the like; pyrrolidino; substituted piperazino such as N-hydroxyethyl piperazino, N-methoxyphenylpiperazino, and the like; and cycloalkylamino such as cyclopropylamino, lower alkynylamino such as ethynylamino, propargylamino, butynylamino, hexynylamino, and the like; and the acid addition salts thereof.

It will be appreciated that R is a group joined to the alkylene bridge by a nitrogen atom. This structure can be written as NB, wherein B can be two separate monovalent radicals such as hydrogen and alkyl, dialkyl, and the like, or a single divalent radical such as alkylene, polymethylene, a hetero interrupted polyalkylene such as tetramethyleneamino, and the like.

The compounds of this invention can be prepared by reducing the corresponding carbamoyl compound with lithium aluminum hydride. The carbamoyl compounds can easily be prepared according to the following reaction scheme in which X, Y, and R have the meanings set forth above in regard to Formula I, and 1 is selected as the value of $a$.

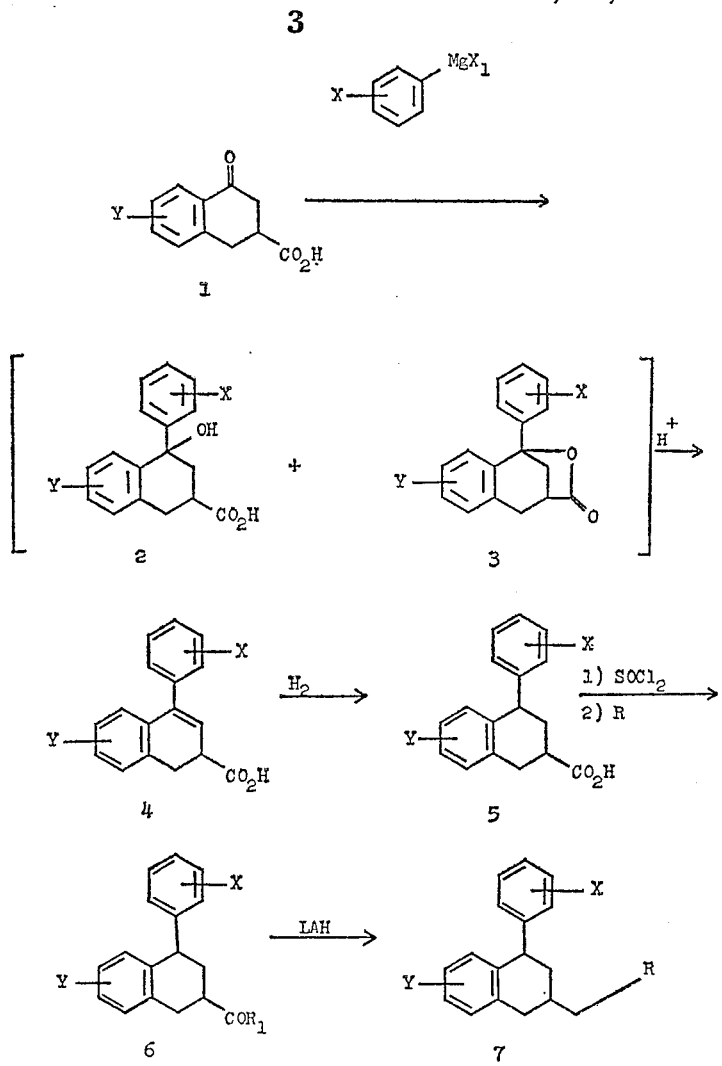

As will be recognized by those in the art, the 1-substituted phenyl-3-substituted - 1,2,3,4 - tetrahydro(substituted)-naphthalenes of this invention can be prepared by a number of alternate routes. For example, the dihydronaphthalene carboxylic acid can be reacted with thionyl chloride and the desired amine, this reaction being followed by reduction of the resulting carbamoyl to the corresponding dihydronaphthalene-3-substituted amine compound. This material can then be reduced to the tetrahydronaphthalene derivative. Alternatively, the dihydronaphthalene can be converted to the tetrahydro form before reduction of the carbamoyl group.

In another synthetic sequence, the dihydronaphthalene carboxylic acid is converted to the tetrahydro compound which is then converted to an ester, e.g., the 3-carbomethoxy compound. The resulting ester can be reduced to the corresponding alcohol, e.g., the 3-hydroxymethyl compound, which is then reacted with methanesulfonyl chloride to provide the corresponding mesylate. The mesylate compound can then be reacted with a suitable amine to provide the final product.

The carbamoyl compounds of Formula I are useful as intermediates in the preparation of the amino compounds of Formula II.

A particularly preferred group of carbamoyl compounds are those in which the 3-position is selected from the group consisting of N-methylcarbamoyl,
N-ethylcarbamoyl,
N-propylcarbamoyl,
N-isopropylcarbamoyl,
N,N-dimethylcarbamoyl,
N,N-diethylcarbamoyl,
N-[1-(3-dimethylamino)propyl]carbamoyl,
N-[1-(2-propynyl)]carbamoyl,
N-cyclopropylcarbamoyl,
pyrrolidinocarbonyl,
[1-(4-hydroxy-2-ethyl)piperazinocarbonyl],
[1-(4-methoxy-2-phenyl)piperazinocarbonyl].

The amino compounds of this invention, particularly 1-phenyl-3-aminomethyl - 1,2,3,4 - tetrahydronaphthalene and 1-phenyl-3-methylaminomethyl - 1,2,3,4 - tetrahydronaphthalene, possesses appetite suppressant properties as well as the functional properties of an antidepressant and central nervous system stimulant.

The anorectic properties were investigated by an assay based on the reduction of food intake by fasted animals presented with a measured amount of food for a given period of time. The assay is conducted on groups of animals which are orally dosed with the test compound. At a predetermined time e.g., 1 hour later, the animals are given a measured amount of food. The amount of food consumed within a given time period is determined and compared with results obtained on control animals and animals receiving a standard anorectic compound.

The effective dose, in milligrams per kilogram (mg./kg.) of body weight obtained on mice and rats, respectively, was found to be 6 and 7.5 for the 3-aminomethyl compound and 25 and 10 for the 3-methylaminomethyl compound. As a comparison, the compound d-amphetamine had a corresponding value of 2 and 1 mg./kg. and chlorphentermine had an effective dose value of 10 mg./kg. for both mice and rats.

The minimum effective dose, in milligrams per kilogram of body weight, for oral administration is determined according to a standardized procedure. In the case of mice and rats, the minimum effective dose is the amount which causes a 50 and 70 percent reduction, respectively, in food intake as compared to a control group of untreated animals.

These same compounds exhibited significant central nervous system stimulant and antidepressant activities. The 3-aminomethyl and 3-methylaminomethyl compounds mentioned above were effective in reversing reserpine-induced ptosis in tests conducted on mice at minimum effective dosage levels of 12 and 6 mg./kg., per os. Comparative tests with d-amphetamine and chlorphentermine gave results of 5 and 10 mg./kg., respectively. These compounds were also effective in overcoming the sedative effect of tetrabenazine in rats at dose levels of 20 and 10 mg./kg. when administered by the intraperitoneal route.

The compounds were also found to increase spontaneous locomotor activity, in mice at a dosage level of about 5 mg./kg. for 1-phenyl-3-aminomethyl-1,2,3,4-tetrahydronapthalene and about 20 mg./kg. for 1-phenyl-3-methylaminomethyl-1,2,3,4-tetrahydronapthalene. The $LD_{50}$, i.e., the dose causing acute toxicity and death in 50 percent of the test animals, for these two compounds was found to be 95 and 150 mg./kg., respectively.

The compounds of this invention can be administered in stimulating or appetite inhibiting amounts as ether the free base or a nontoxic, acid addition salt thereof. The various forms of the compound can be formulated into unit dosage form for oral or parenteral administration either alone or in combination with other therapeutic agents. The therapeutic agents can be admixed with a wide variety of liquid or non-liquid carriers, vehicles, or excipients which are well known in the pharmaceutical industry. Illustrative materials for admixture include sugars, cellulose derivatives, gelatin, talc, magnesium stearate, vegetable oils, liquid petroleum glycerin, sorbitol, ethanol, agar, water, and the like.

The dosage units can be in the form of tablets, capsules, powders, granules, suspensions, solutions, and the like, for administration of an effective amount of the therapeutic composition, e.g., a dose of about 15 to 30 milligrams two or three times per day.

Other compounds of the herein described class were evaluated for anorectic and central nervous system activity. Table I, below, sets forth the minimal effective dose, in milligrams per kilogram, for each type of activity as determined by oral administration to mice. These compounds have the formula

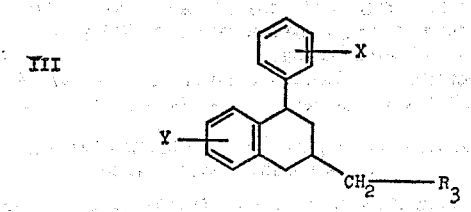

wherein X, Y, and $R_3$ are a shown in Table I, below.

TABLE I

| $R_3$ | X | Y | Anorectic activity | Activity |
|---|---|---|---|---|
| $NHCH_2CH_3 \cdot HCl$ | H | H | 10 | 50 |
| $NHCH_2CH_2CH_3 \cdot HCl$ | H | H | 12.5 | 25 |
| $N(CH_3)_2 \cdot HCl$ | H | H | 20 | 25 |
| $N(CH_2CH_3)_2 \cdot C_6H_{11}NHSO_3H$ | H | H | 50 | >50 |
| $NH(CH_2)_3N(CH_3)_2 \cdot 2HCl$ | H | H | 50 | 100 |
| $NHCH_2C{\equiv}CH \cdot HCl$ | H | H | >50 | >100 |
| $-N\!\!\bigcirc \cdot HCl$ | H | H | >25 | 100 |
| $-N\!\!\bigcirc\!\!N\!-\!CH_2CH_2OH \cdot 2HCl$ | H | H | >20 | >300 |
| $-N\!\!\bigcirc\!\!N\!-\!\bigcirc\!-\!OCH_3 \cdot 2HCl$ | H | H | >50 | >300 |
| $NH\!-\!\bigcirc \cdot HCl$ | H | H | 12.5 | 10 |
| $NH_2 \cdot HCl$ | 3-($CF_3$) | H | 25 | [1] 300 |
| $NHCH_3 \cdot HCl$ | 3-($CF_3$) | H | 50 | >100 |
| $N(CH_3)_2 \cdot HCl$ | 3-($CF_3$) | H | 50 | >100 |

[1] Approximately.

The following examples will illustrate the principles and the practice of this invention.

These in the art will appreciate that due to their structural arrangement, compounds of this invention exist in conformation isomers, i.e., the cis and trans forms which can be prepared from the corresponding isomeric form of an appropriate intermediate. It should also be noted that the presence of asymmetric centers provides for the existence of optical isomers. All of these isomeric forms, both conformational and configurational, are within the scope of the invention and the terminology used to describe the compounds disclosed herein. The cis conformation is believed to be more readily prepared and for this reason is a particularly beneficial embodiment of the invention.

Example 1.—1-phenyl-3-carboxy-3,4-dihydronaphthalene

Under anhydrous conditions, 300 ml. of 2.47 N (0.66 mole) of phenyl magnesium chloride in tetrahydrofuran was added dropwise, over a period of two hours, to a solution of 57.1 gm. (0.30 mole) of 3-carboxy-1-tetralone.[1] During addition of phenyl magnesium chloride, the temperature was maintained at about 20° C. The resulting mixture was refluxed for 21 hours. After reflux, the reaction mixture was cooled in an ice bath and 150 ml. of 5 N sulfuric acid was added thereto, with stirring, over a one hour period after which 500 ml. water was added. The resulting mixture was extracted twice with 400 ml. portions of ether. The combined ether extracts were washed with three 500 ml. portions of water and one 400 ml. portion of brine. The ether layer was dried over sodium sulfate, filtered and then solvent evaporated under reduced pressure. The residue was dissolved in 500 ml. of benzene and 5 g. of p-toluenesulfonic acid was added thereto. The resulting admixture was refluxed for 16 hours with azeotropic removal of water. The benzene was then evaporated and 500 ml. of 10% sodium carbonate solution was added to the residue. The resulting mixture was extracted twice with 400 ml. portions of ether. The aqueous solution was acidified with concentrated sulfuric acid, with cooling. The resulting solid material was collected by filtration, washed, dried, and redissolved in 800 ml. of hot 95% ethanol containing activated charcoal. After stirring for one hour, the solution was filtered through infusorial earth. Addition of water to the filtered solution provided a crystalline product at a yield of about 64%. The product had a melting point between 164° C.

[1] See Beech et al., J. Chem. Soc., 1887 (1949) and Haworth et al., J. Chem. Soc., 10 (1943).

and 168° C. A sample recrystallized from 95% ethanol and water was found to have a melting point between 167° C. and 169° C. and the following analysis:

Calculated for $C_{17}H_{14}O_2$ (percent): C, 81.58; H, 5.64. Found (percent): C, 81.53; H, 5.64.

Example 2.—1-(3-trifluoromethylphenyl)-3-carboxy-3,4-dihydronaphthalene

Following the procedure described in Example 1, a Grignard solution prepared from 225 gm. (1.0 mole) of 3-trifluoromethylbromobenzene and 24.3 gm. (1.0 mole) of magnesium in 400 ml. of tetrahydrofuran was added to a solution of 85.5 gm. (0.45 mole) of 3-carboxy-1-tetralone in 400 ml. of tetrahydrofuran. The resulting admixture was refluxed for 17 hours and the product obtained as described in Example 1 by azeotropic distillation with 9.0 gm. of p-toluenesulfonic acid in 500 ml. of benzene. The yield was 62% of a product having a melting point of from 138° C. to 141° C. Recrystallization gave a material having a melting point of 142° C. to 143° C. and the following analysis:

Calculated for $C_{18}H_{13}F_3O_2$ (percent): C, 67.92; H, 4.12. Found (percent): C, 68.02; H, 4.24.

Example 3.—1-phenyl-3-carboxy-1,2,3,4-tetrahydronaphthalene

A mixture of 27.9 gm. of 1-phenyl-3,4-dihydro-3-carboxynaphthalene and 4.0 gm. 10% palladium on carbon in 900 ml. of ethanol was hydrogenated in a large Parr apparatus. The reaction product mixture was filtered, evaporated to dryness, and dissolved in a solvent comprising essentially n-hexane. Upon cooling, the above product was obtained at a yield of about 87.5%, having a melting point of from 172° C. to 176° C., and the following analysis:

Calculated for $C_{17}H_{16}O_2$ (percent): C, 80.92; H, 6.39. Found (percent): C, 80.74; H, 6.41.

Example 4.—1-(3-trifluoromethylphenyl)-3-carboxy-1,2,3,4-tetrahydronaphthalene

The same procedure, as described in Example 3, using 3.18 gm. (0.01 mole) of 1-(3-trifluoromethylphenyl)-3-carboxy-3,4-dihydronaphthalene and 0.5 gm. of 10% palladium on carbon in 100 ml. of ethanol afforded a 91% yield of a product having a melting point of 164° C. to 168° C. Recrystallization of that material from ethyl acetate-n-pentane gave a product having a melting point of 173° C. to 177° C. and the following analysis:

Calculated for $C_{18}H_{15}F_3O_2$ (percent): C, 67.50; H, 4.72. Found (percent): C, 67.62; H, 4.98.

Example 5.—1-phenyl-3-carbamoyl-1,2,3,4-tetrahydronaphthalene

A solution of 6.3 gm. of 1-phenyl-3-carboxy-1,2,3,4-tetrahydronaphthalene in 150 ml. of thionyl chloride was refluxed for three hours. Excess thionyl chloride was removed from the reaction mixture by evaporation. The residue was mixed with benzene and again evaporated to dryness. The residue was then redissolved in 250 ml. of dry benzene. Ammonia was bubbled through the reaction mixture, with stirring, for a period of ten minutes after which stirring was continued at room temperature for one hour. Ammonia was again bubbled through the solution for ten minutes and the admixture was refluxed for one hour. The resulting solution was then evaporated to dryness. The solid residue was mixed with water, filtered, washed with water, and dried. The product was recrystallized from 95% ethanol and water. Subsequent recrystallization from a benzene-petroleum ether mixed solvent provided a material having a melting point of from 186.0° C. to 186.5° C. and the following analysis:

Calculated for $C_{17}H_{17}NO$ (percent): C, 81.24; H, 6.82; N, 5.57. Found (percent): C, 81.43; H, 6.85; N, 5.54.

Example 6.—1-phenyl-2-N-methylcarbamoyl-1,2,3,4-tetrahydronaphthalene

A solution of 5.1 g. (0.02 mole) 1-phenyl-3-carboxy-1,2,3,4-tetrahydronaphthalene in 100 ml. of thionyl chloride was refluxed for two hours and the reaction product recovered was as described in Example 5. The residue was dissolved in 500 ml. of benzene and then monomethylamine was bubbled through the solution, with vigorous stirring, for ten minutes. Stirring was continued at room temperature for one hour and then the solution was refluxed for one hour. Recrystallization of the reaction product from 95% ethanol-water provided a material having a melting point of 183° C. to 184° C. and the following analysis:

Calculated for $C_{18}H_{19}NO$ (percent): C, 81.47; H, 7.22; N, 5.28. Found (percent): C, 81.77; H, 7.49; N, 5.46.

Example 7.—1-phenyl-3-N-ethylcarbamoyl-1,2,3,4-tetrahydronaphthalene

A solution of 4.0 g. (0.016 mole) 1-phenyl-3-carboxy-1,2,3,4-tetrahydronaphthalene in 80 ml. of thionyl chloride was refluxed for two hours and the reaction product isolated as described in Example 5. The residue was dissolved in 250 ml. of dry benzene and to that solution there was added slowly, with vigorous stirring, 30 ml. of anhydrous ethylamine. The resulting admixture was stirred at room temperature for two hours. There was obtained, after recrystallization as described in Example 5, an 89% yield of product having a melting point of 183° C. to 187° C. and the following analysis:

Calculated for $C_{19}H_{21}NO$ (percent): C, 81.72; H, 7.52; N, 5.02. Found (percent): C, 81.53; H, 7.60; N, 5.13.

Example 8.—1-phenyl-3-N-n-propylcarbamoyl-1,2,3,4-tetrahydronaphthalene

A solution of 2.5 g. (0.01 mole) of 1-phenyl-3-carboxy-1,2,3,4-tetrahydronaphthalene in 40 ml. of thionyl chloride was refluxed for two hours. The reaction product obtained in accordance with Example 5 was dissolved in 100 ml. of dry benzene. To the resulting solution there was added slowly, with vigorous stirring, 5.0 ml. (6.06 moles) of n-propylamine. The resulting mixture was stirred at room temperature for two hours. There was obtained a 95% yield of product, having a melting point of 177° C. to 179° C. and the following analysis:

Calculated for $C_{20}H_{23}NO$ (percent): C, 81.87; H, 7.90; N, 4.77. Found (percent): C, 81.89; H, 7.93; N, 4.72.

Example 9.—1-phenyl-3-N-isopropylcarbamoyl-1,2,3,4-tetrahydronaphthalene

The acid chloride of 5.0 g. (0.02 mole) 1-phenyl-3-carboxy-1,2,3,4-tetrahydronaphthalene was prepared as described in Example 5. This material was dissolved in 250 ml. of benzene, and to the resulting solution there was added 20 ml. (0.23 mole) of isopropylamine. The admixture was stirred at room temperature for one hour and then refluxed one hour. The reaction mixture was evaporated to near dryness, mixed with water, and the crystalline product separated by filtration. Recrystallization of the product from 95% ethanol-water gave an 87% yield of material having a melting point of 191° C. to 193° C. and the following analysis:

Calculated for $C_{20}H_{23}NO$ (percent): C, 81.87; H, 7.90; N, 4.77. Found (percent): C, 81.89; H, 7.79; N, 4.72.

Example 10.—1-phenyl-3-N,N-dimethylcarbamoyl-1,2,3,4-tetrahydronaphthalene

The acid chloride of 3.98 g. (0.0158 mole) 1-phenyl-3-carboxy-1,2,3,4-tetrahydronaphthalene was prepared as described in Example 5. The residue was dissolved in 400 ml. of benzene. While keeping the temperature of the solution at 5° C. to 10° C., dimethylamine was bubbled through for five minutes. The resulting solution was then refluxed for one hour. The reaction product mixture was evaporated to dryness and the residue dissolved in ether.

The ether solution was washed with water, 5% bicarbonate, and brine. The ether solution was then dried, filtered, and evaporated to give a viscous oil. The IR and NMR spectra were consistent with the desired structure and the material was reduced directly to the corresponding amine without further purification.

Example 11.—1-phenyl-3-N,N-diethylcarbamoyl-1,2,3,4-tetrahydronaphthalene

A solution containing 5.05 g. of 1-phenyl-3-carboxy-1,2,3,4-tetrahydronaphthalene in 80 ml. of thionyl chloride was refluxed for two hours and thereafter treated as in Example 5. The acid chloride was dissolved in 250 ml. of benzene and to the resulting solution there was added 25 ml. of diethylamine. The resulting reaction mixture was refluxed for one hour after which it was cooled, washed successively with 5% hydrochloric acid, water, 5% sodium bicarbonate, water, and a saturated sodium chloride solution. The washed reaction product mixture was dried, filtered, and evaporated to give an oily product. The IR and NMR spectra were consistent with the structure of the desired material.

EXAMPLE 12

Following the general procedure of Example 11 and substituting dimethylaminopropylamine, propargylamine, cyclopropylamine, pyrrolidine, N-beta-hydroxyethylpiperazine, and 1-(ortho-methoxyphenyl)piperazine, there was prepared 1-phenyl-3-N-[1-(3-dimethylamino)propyl]carbamoyl-1,2,3,4-tetrahydronaphthalene,
1-phenyl-3-N-[1-(2-propynyl)]carbamoyl-1,2,3,4-tetrahydronaphthalene,
1-phenyl-3-N-cyclopropylcarbamoyl-1,2,3,4-tetrahydronaphthalene,
1-phenyl-3-(1-pyrrolidinocarbonyl)-1,2,3,4-tetrahydronaphthalene,
1-phenyl-3-[1-(4-hydroxy-2-ethyl)piperazinocarbonyl]-1,2,3,4-tetrahydronaphthalene, and
1-phenyl-3-[1-(4-methoxy-2-phenyl)piperazinocarbonyl]-1,2,3,4-tetrahydronaphthalene, respectively.

EXAMPLE 13

Substitution of 1-(3-trifluoromethylphenyl)-3-carboxy-1,2,3,4-tetrahydronaphthalene in the procedures described in Examples 5, 6, and 10, above, provided the compounds 1-(3-trifluoromethylphenyl)-3-carbamoyl-1,2,3,4-tetrahydronaphthalene,
1-(3-trifluoromethylphenyl)-3-N-methylcarbamoyl-1,2,3,4-tetrahydronaphthalene, and
1-(3-trifluoromethylphenyl)-N,N-dimethylcarbamoyl-1,2,3,4-tetrahydronaphthalene, respectively.

Example 14.—1-phenyl-3-aminomethyl-1,2,3,4-tetrahydronaphthalene hydrochloride

Under anhydrous conditions, 4.8 g. (0.02 mole) of solid 1 - phenyl - 3 - carbamoyl-1,2,3,4-tetrahydronaphthalene was added to a suspension of 1.5 g. (0.04 mole) of lithium aluminum hydride in 250 ml. of dry tetrahydrofuran. The resulting mixture was refluxed, under nitrogen, for sixteen hours. After cooling, there was added with stirring to the reaction mixture, 1 ml. of water and 0.8 ml. of 10% sodium hydroxide per 0.5 g. of lithium aluminum hydride used. The resulting mixture was stirred at room temperature for two hours. The resulting reaction product was filtered, washed with ether, and evaporated to dryness. The residue was dissolved in anhydrous ether and treated with hydrogen chloride. The product was filtered, washed with ether, and dried to give a yield of 87%. Recrystallization of the product from a mixture of ethanol and ether gave a material having a melting point of from 291° C. to 292° C. and the following analysis:

Calculated for $C_{17}H_{19}N \cdot HCl$ (percent): C, 74.57; H, 7.36; N, 5.12; Cl, 12.95. Found (percent): C, 74.48; H, 7.53; N, 5.00; Cl, 12.92.

Example 15.—1-phenyl-3-methylaminomethyl-1,2,3,4-tetrahydronaphthalene hydrochloride The same procedure and work-up as described in Example 11, using 3.65 g. (0.0138 mole) 1-phenyl-3-N-methylcarbamoyl-1,2,3,4-tetrahydronaphthalene and 0.76 g. (0.02 mole) of lithium aluminum hydride, afforded a 96% yield of product, after salt formation. Recrystallization from absolute ethanol-ether provided a material having a melting point of 253° C. to 255° C. and the following analysis:

Calculated for $C_{18}H_{22}N \cdot HCl$ (percent): C, 75.11; H, 7.71; N, 4.87; Cl, 12.32. Found (percent): C, 75.21; H, 7.78; N, 4.86; Cl, 12.36.

Example 16.—1-phenyl-3-ethylaminomethyl-1,2,3,4-tetrahydronaphthalene

The same procedure and work-up described in Example 11, using 2.89 g. (0.01 mole) of 1-phenyl-3-N-ethylcarbamoyl - 1,2,3,4-tetrahydronaphthalene and 0.76 g. (0.02 mole) of lithium aluminum hydride in 100 ml. tetrahydrofuran afforded a 95.5% yield of product, after salt formation. Recrystallization from absolute ethanol-ether gave a product having a melting point of 257° C. to 258° C. and the following analysis:

Calculated for $C_{19}H_{23}N \cdot HCl$ (percent): C, 75.58; H, 8.01; N, 4.63; Cl, 11.74. Found (percent): C, 75.53; H, 8.06; N, 4.75; Cl, 11.90.

Example 17.—1-phenyl-3-n-propylaminomethyl-1,2,3,4-tetrahydronaphthalene hydrochloride The procedure described in Example 11 was employed using 1.45 g. (0.0049 mole) 1-phenyl-3-N-n-propylcarbamoyl-1,2,3,4-tetrahydronaphthalene and 0.44 g. (0.012 mole) lithium aluminum hydride in 100 ml. of tetrahydrofuran to give a 94% yield of product, after salt formation. Recrystallization from ethanol-ether gave a product having a melting point of 240° C. to 241° C. and the following analysis:

Calculated for $C_{20}H_{25}N \cdot HCl$ (percent): C, 76.05; H, 8.30; N, 4.44; Cl, 11.22. Found (percent): C, 76.28; H, 8.26; N, 4.42; Cl, 11.20.

Example 18.—1-phenyl-3-isopropylaminomethyl-1,2,3,4-tetrahydronaphthalene hydrochloride This product was prepared by the procedure described in Example 11, using 4.4 g. (0.015 mole) of the corresponding carbamoyl compound and 1.14 g. (0.03 mole) of lithium aluminum hydride in 250 ml. of tetrahydrofuran. A 94% yield was obtained and recrystallization of the product from a methanol-ether mixture provided a material having a melting point of 284° C. to 286° C. and the following analysis:

Calculated for $C_{20}H_{25}N \cdot HCl$ (percent): C, 76.04; H, 8.30; N, 4.44; Cl, 11.22. Found (percent): C, 75.90; H, 8.39; N, 4.45; Cl, 11.28.

Example 19.—1-phenyl-3-dimethylaminomethyl-1,2,3,4-tetrahydronaphthalene hydrochloride Substituting in the procedure of Example 11, 4.4 g. (0.016 mole) of 1-phenyl-3-N,N-dimethylcarbamoyl-1,2,3,4-tetrahydronaphthalene and 0.6 g. of lithium aluminum hydride in 125 ml. of tetrahydrofuran, there was obtained an 86% yield of the corresponding 1-phenyl-3-dimethylaminomethyl - 1,2,3,4-tetrahydronaphthalene hydrochloride. Subsequent recrystallization from a mixture of acetonitrile and ether provided a material having a melting point of 185° C. to 186° C. and the following analysis:

Calculated for $C_{19}H_{23}N \cdot HCl$ (percent): C, 75.60; H, 8.01. Found (percent): C, 75.49; H, 8.00.

Example 20.—1-phenyl-3-diethylaminoethyl-1,2,3,4-tetrahydronaphthalene cyclohexylsulfamate Following the procedure set forth in Example 11, 5 g. of 1-phenyl-3-N,N-diethylcarbamoyl-1,2,3,4-tetrahydronaphthalene was reduced with 0.66 g. of lithium aluminum hydride in 250 ml. of tetrahydrofuran. The free base was dissolved in absolute ethanol and to the resulting solution there was added 2.3 g. of cyclohexylsulfamic acid. The admixture was warmed gently on a steam bath. The mixture was cooled and ether added to provide the above product. Recrystallization from acetonitrile-ether solvent provided a material having a melting point of 157° C. to 159° C. and the following analysis:

Calculated for $C_{21}H_{27}N \cdot C_6H_{13}NO_3S$ (percent): C, 68.61; H, 8.53; N, 5.93; S, 6.78. Found (percent): C, 68.52; H, 8.36; N, 5.86; S, 6.86.

Example 21.—1-phenyl-3-[1-(3-dimethylamino)propyl]aminomethyl-1,2,3,4-tetrahydronaphthalene dihydrochloride The same procedure and work-up as described in Example 11, using 2.27 g. (0.0068 mole) of 1-phenyl-3-N-[1-(3-dimethylamino)propyl]carbamoyl-1,2,3,4-tetrahydronaphthalene and 0.42 g. (0.0112 mole) of lithium aluminum hydride in 100 ml. of tetrahydrfuran afforded 97% yield of product, after salt formation. Recrystallization from absolute ethanol-ether gave a material having a melting point of 248° C. to 249° C. and the following analysis:

Calculated for $C_{22}H_{30}N_2 \cdot 2HCl$ (percent): C, 66.83; H, 8.16; N, 7.08; Cl, 17.93. Found (percent): C, 66.77; H, 8.30; N, 7.26; Cl, 17.75.

Example 22.—1-phenyl-3-[1-(2-propynyl)]aminomethyl-1,2,3,4-tetrahydronaphthalene hydrochloride The same procedure and work-up described in Example 11, using 1.2 g. (0.0042 mole) 1-phenyl-3-N-[1-(2-propynyl)]carbamoyl-1,2,3,4-tetrahydronaphthalene and 0.21 g. (0.0055 mole) lithium aluminum hydride in 100 ml. of tetrahydrofuran afforded a yield of 81.4% product, after salt formation. Recrystallization from acetonitrile-ether gave a material having a melting point of 182° C. to 183° C. and the following analysis:

Calculated for $C_{20}H_{22}N \cdot HCl$ (percent): C, 76.78; H, 7.41; N, 4.48. Found (percent): C, 76.04; H, 7.43; N, 4.47.

Example 23.—1-phenyl-3-(1-pyrrolidino)methyl-1,2,3,4-tetrahydronaphthalene hydrochloride Repeating the procedure described in Example 11, using 3.7 g. (0.012 mole) of 1-phenyl-3-(1-pyrrolidinocarbonyl)-1,2,3,4-tetrahydronaphthalene and 0.46 g. (0.013 mole) of lithum aluminum hydride in 250 ml. of tetrahydrofuran afforded a 77% yield of product, after salt formation, having a melting point of 224° C. to 226° C. and the following analysis after recrystallization from acetonitrile-ether:

Calculated for $C_{21}H_{25}N \cdot HCl$ (percent): C, 76.92; H, 7.99; N, 4.28; Cl, 10.81. Found (percent): C, 76.88; H, 8.13; N, 4.37; Cl, 10.90.

Example 24.—1-phenyl-3-{1-[4-(2-hydroxyethyl)piperazine]}methyl-1,2,3,4-tetrahydronaphthalene dihydrochloride The same procedure described in Example 11, using 210 g. (0.0055 mole) of 1-phenyl-3-{1-[4-(2-hydroxyethyl)]piperazinocarbonyl}-1,2,3,4-tetrahydronaphthalene and 0.63 g. (0.0165 mole) of lithium aluminum hydride in 100 ml. of tetrahydrofuran gave 77% yield, after salt formation and recrystallization from methanol-ether, of a material having a melting point of 268° C. to 269° C.

Calculated for $C_{23}H_{30}N_2 \cdot HCl$ (percent): C, 65.24; H, 7.62; N, 6.62; Cl, 16.75. Found (percent): C, 65.00; H, 7.44; N, 6.62; Cl, 16.78.

Example 25.—1-phenyl-3-{1-[4-(2-methoxyphenyl)piperazino]}methyl-1,2,3,4-tetrahydronaphthalene dihydrochloride The same procedure described in Example 11, using 3.4 g. (0.008 mole) of 1-phenyl-3-{1-[4-(2-methoxyphenyl)]piperazino}-1,2,3,4-tetrahydronaphthalene and 0.61 g. (0.016 mole) of lithium aluminum hydride in 100 ml. of tetrahydrofuran afforded, after salt formation and recrystallization from methanol-ether, a 75% yield of product, having a melting point of 230° C. to 231° C. and the following analysis:

Calculated for $C_{28}H_{32}N_2O \cdot 2HCl$ (percent): C, 69.27; H, 7.06; N, 5.77; Cl, 14.61. Found (percent): C, 69.27; H, 7.04; N, 5.73; Cl, 14.60.

Example 26.—1-(3-trifluoromethylphenyl)-3-aminomethyl-1,2,3,4-tetrahydronaphthalene hydrochloride The procedure described in Example 11, using 2.9 g. (0.009 mole) of 1-(3-trifluoromethylphenyl)-3-carbamoyl-1,2,3,4-tetrahydronaphthalene and 0.68 g. (0.018 mole) of lithium aluminum hydride in 100 ml. of tetrahydrofuran provided a product, after recrystallization from ethanol-ether, having a melting point of 289° C. to 291° C. and the following analysis:

Calculated for $C_{18}H_{18}F_3N \cdot HCl$ (percent): C, 63.25; H, 5.60; N, 4.01; Cl, 10.37. Found (percent): C, 63.35; H, 5.55; N, 4.02; Cl, 10.48.

Example 27.—1-(3-trifluoromethylphenyl)-3-methylaminomethyl-1,2,3,4-tetrahydronaphthalene hydrochloride The procedure described in Example 11, carried out on 3.0 g. (0.009 mole) of 1-(3-trifluoromethylphenyl)-3-methylcarbamoyl-1,2,3,4-tetrahydronaphthalene and 0.38 g. (0.01 mole) of lithium aluminum hydride in 100 ml. of tetrahydrofuran, provided a yield of 94.5%. Recrystallization of the reaction product from acetonitrile-ether gave a material having a melting point of 187° C. to 188° C. and the following analysis:

Calculated for $C_{19}H_{21}F_3N \cdot HCl$ (percent): C, 64.13; H, 5.95; N, 3.94; Cl, 9.96. Found (percent): C, 64.20; H, 5.95; N, 4.29; Cl, 10.17.

Example 28.—1-(3-trifluoromethylphenyl)-3-dimethylaminomethyl-1,2,3,4-tetrahydronaphthalene hydrochloride Following the procedure described in Example 11, using 5.0 g. (0.014 mole) of 1-(3-trifluoromethylphenyl)-3-N,N-dimethylcarbamoyl-1,2,3,4-tetrahydronaphthalene and 0.76 g. (0.02 mole) of lithium aluminum hydride in 250 ml. of tetrahydrofuran provided a 80.5% yield of product. A second recrystallization provided a material having a melting point of 234° C. to 236° C. and the following analysis:

Calculated for $C_{20}H_{22}F_3N \cdot HCl$ (percent): C, 64.95; H, 6.27; N, 3.79; Cl, 9.58. Found (percent): C, 64.79; H, 6.22; N, 3.94; C, 9.55.

Example 29.—1-phenyl-3-carbomethoxy-1,2,3,4-tetrahydronaphthalene

A mixture of 10 g. (0.0396 mole) of 1-phenyl-3-carboxy-1,2,3,4-tetrahydronaphthalene and 2 ml. of concentrated sulfuric acid in 230 ml. of methanol was refluxed for 5 hours. The solvent was evaporated and the residue dissolved in ether. The ether solution was washed with water, 5% bicarbonate, and brine. The solution was then dried, filtered, and evaporated to dryness. Addition of n-hexane afforded a 71% product yield having a melting point of 78° C. to 80° C. Recrystallization from methanol-water provided a material having a melting point of 77° C. to 80° C. and the following analysis:

Calculated for $C_{18}H_{18}O_2$ (percent): C, 81.17; H, 6.81. Found (percent): C, 81.05; H, 6.90.

Example 30.—1-phenyl-3-N-cyclopropylaminomethyl-1,2,3,4-tetrahydronaphthalene A mixture of 2.05 g. of 1-phenyl-3-hydroxymethyl-1,2,3,4-tetrahydronaphthalene mesylate, 4.1 g. cyclopropylamine, 0.69 g. anhydrous sodium carbonate, and a small amount of potassium iodide in 100 ml. of ethanol was heated on a steam bath in a sealed pressure bottle for 19 hours. The reaction mixture was then poured into 800 ml. of water and extracted with ether. The ether extract was washed with water, and then with brine. The washed extract was then dried, filtered and evaporated to dryness. The residue was converted to the hydrochloride salt in ether and crystallized from an ethanol-ether solvent to provide a product having a melting point of 225° C. to 227° C. and the following analysis:

Calculated for $C_{20}H_{23}N \cdot HCl$ (percent): C, 76.53; H, 7.71; N, 4.46; Cl, 11.29. Found (percent): C, 76.63; H, 7.77; H, 4.42; Cl, 11.34.

Example 31.—1-phenyl-3-hydroxymethyl-1,2,3,4-tetrahydronaphthalene

Under anhydrous conditions there was added 8.02 g. (0.03 mole) of 1 - phenyl-3-carbomethoxy-1,2,3,4-tetrahydronaphthalene to a suspension of 1.25 g. (0.033 mole) of lithium aluminum hydride in 100 ml. of dry tetrahydrofuran. The mixture was refluxed under nitrogen for 19 hours. After cooling there was added with vigorous stirring one ml. of water per 0.5 g. of lithium aluminum hydride and 0.8 ml. of 10% sodium hydroxide per 0.5 g. of lithium aluminum hydride used and resultant mixture was stirred at room temperature for two hours. The reaction product mixture was filtered, the solid washed with ether, and the filtrate evaporated to dryness. Addition of n-pentane afforded 99.4% yield of crystalline product having a melting point of 104° C. to 109° C. Recrystallization from ethylacetate-n-hexane gave a melting point of 114° C. to 115° C.

Calculated for $C_{17}H_{18}O$ (percent): C, 85.6; H, 7.61. Found (percent): C; 85.91; H, 7.77.

Example 32.—1-phenyl-3-hydroxymethyl-1,2,3,4-tetrahydronaphthalene mesylate

Under anhydrous conditions, there was added dropwise, with vigorous stirring, 1.6 g. (0.014 mole) of methane sulfonyl chloride to a solution of 2.38 g. (0.01 mole) of 1 - phenyl-3-hydroxymethyl-1,2,3,4-tetrahydronaphthalene in 15 ml. of pyridine at 10° C. The reaction mixture was stirred in an ice bath at 10° C. for 10 minutes. The ice bath was removed and the mixture was stirred at room temperature for three hours. The reaction mixture was poured onto an ice-water mixture and stirred for 20 minutes. The reaction product was recovered by filtration, washed with cold water, and dried. This procedure afforded 95.5% product, having a melting point of 110° C. to 113° C. Recrystallization from ethanol-n-hexane gave a material having a melting point of 113° C. to 115° C.

Calculated for $C_{18}H_{20}O_3S$ (percent): C, 68.33; H, 6.37; S, 10.13. Found (percent): C, 68.32; H, 6.37; S, 10.14.

Example 33.—Trans - 1 - hydroxy - 1 - phenyl-3-carboxy-1,2,3,4-tetrahydronaphthalene and 1-hydroxy-1-phenyl-3 - carboxy - 1,2,3,4 - tetrahydronaphthalene-gamma-lactone Under anhydrous conditions, 27 ml. of 2.47 N phenylmagnesium chloride in tetrahydrofuran was added to a vigorously stirred solution of 5.7 g. of 3-carboxy-1-tetralone in 175 ml. of tetrahydrofuran. During addition, the temperature was maintained at 10° C. to 15° C. The resulting admixture was refluxed for six hours. After reflux, the reaction mixture was placed in an ice bath and 11.0 ml. of 6 N sulfuric acid was added slowly thereto with stirring. This was followed by the addition of 300 ml. of water. The resulting mixture was extracted with ether and the ether extract washed twice with water and once with brine. The ether was dried over sodium sulfate, filtered and evaporated under reduced pressure. The residue was then maintained at room temperature for 18 hours.

The residue was then dissolved in ether and extracted with a 5% solution of bicarbonate. The bicarbonate solution was saved and the ether layer washed with water and then brine. The ether portion was dried, filtered, and evaporated.

The residue was chromatographed on 90 g. of silica gel, 100 to 200 mesh, eluting with benzene, 1% ether in benzene, 5% ether in benzene, and ether. This provided the abovementioned gamma-lactone compound which when recrystallized from ethyl acetate-n-hexane had a melting point of 128° C. to 130° C. and the following analysis:

Calculated for $C_{17}H_{14}O_2$ (percent): C, 81.58; H, 5.64. Found (percent): C, 81.77; H, 5.94.

Other products isolated from above chromatography were biphenyl, having a melting point of 57° C. to 65° C. and 1-phenyl-3-benzoyl-3,4-dihydronaphthalene, having a melting point of 104° C. to 105° C. and the following analysis:

Calculated for $C_{23}H_{18}O$ (percent): C, 89.00; H, 5.85. Found (percent): C, 89.26; H, 5.79.

The bicarbonate wash from above work-up was acidified and extracted with ether. The ether extracts were washed with water and brine and then dried, filtered, and evaporated. Addition of ethyl acetate and n-hexane gave a white crystalline solid, having a melting point of 119° C. to 125° C. Recrystallization from ethyl acetate and n-hexane afforded 69.4° analytical sample of trans 1-hydroxy - 1-phenyl-3-carboxy-1,2,3,4-tetrahydronaphthalene with a melting point of 131° C. to 133° C. and the following analysis:

Calculated for $C_{17}H_{16}O_3$ (percent): C, 76.10; H, 6.01. Found (percent): C, 75.94; H, 6.12.

We claim:
1. Compounds of the formula

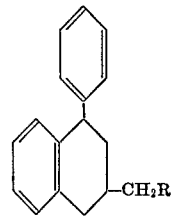

wherein R is selected from the group consisting of amino, methylamino, ethylamino, propylamino, propynylamino, cyclopropylamino, and the nontoxic, pharmaceutically acceptable salts thereof.

2. The compound 1-phenyl-3-aminomethyl-1,2,3,4-tetrahydronaphthalene and its nontoxic, pharmaceutically acceptable acid addition salts, as described in claim 1.

3. The cis conformation of the compound of claim 2.

4. The compound 1 - phenyl - 3-methylaminomethyl-1,2,3,4-tetrahydronaphthalene and its nontoxic, pharmaceutically acceptable acid addition salts as described in claim 1.

5. The cis conformation of the compound of claim 4.

(References on following page)

References Cited

UNITED STATES PATENTS

| | | | |
|---|---|---|---|
| 3,308,157 | 3/1967 | Robertson et al. | 260—570.9 X |
| 3,377,347 | 4/1968 | Jenny et al. | 260—570.9 X |
| 3,455,981 | 7/1969 | Nash et al. | 260—570.9 X |
| 3,504,031 | 3/1970 | Berdahl et al. | 260—570.8 |

ROBERT V. HINES, Primary Examiner

U.S. Cl. X.R.

260— 243 B, 247, 247.1, 247.2 A, 247.5 B, 247.7 A 268 BC, C, 268 PH, 326.3, 326.5 R, 326.81, 326.82, 326.84, 326.85, 329.9, 343.6, 501.12, 501.18, 501.2, 501.21, 515 A, M, 516, 518 B, 520, 544 M, 556 AR, B, 558 S, A, 559 T, A, 562, 570. P, R, 570.8 R, 618 F; 424—246, 248, 250, 274, 330